Patented Mar. 2, 1937

2,072,153

UNITED STATES PATENT OFFICE 2,072,153

SULPHONATED CONDENSATION PRODUCT

Herman A. Bruson, Elkins Park, and Otto Stein, Lansdowne, Pa., assignors to Röhm & Haas Company, Philadelphia, Pa.

No Drawing. Application February 16, 1935, Serial No. 6,808

8 Claims. (Cl. 260—159)

This invention relates to sulphonates of compounds obtained by condensation of aromatic compounds, more particularly hydrocarbons, with polymers of isobutylene, such as the sulphonates of the condensation products of naphthalene with di, tri, or tetraisobutylene or mixtures thereof.

It is already known that phenols or aromatic hydrocarbons will condense with olefines in the presence of concentrated sulphuric acid to form products which are useful as emulsifying or wetting agents. It is also known that certain olefines however, are not suitable for condensation with aromatic hydrocarbons, particularly tertiary olefines, i. e., those containing at least one unsaturated carbon atom which is not attached to a free hydrogen atom.

We have found however, that the above mentioned di, tri, or tetra polymers of isobutylene, even though they are tertiary olefines, can be converted into useful aromatic sulphonates without deleterious polymerization or side reactions. This is accomplished by first condensing the di, tri or tetraisobutylene with the aromatic body by means of a small amount of a powerful acidic condensing agent such as concentrated sulphuric acid, hydrogen chloride, benzene sulphonic acid, stannic chloride, or chlorsulphonic acid, the condensing agent being used as a catalyst. Under these conditions, complete condensation takes place between the tertiary olefine and the aromatic body without the formation of undesirable resinous by-products. The condensation products thus obtained may be freed from catalyst by washing or by neutralizing the latter with alkali, and distilling the oil formed; or they may be directly converted into sulphonates without distillation, by heating with a sulphonating agent such as concentrated sulphuric acid (or fuming sulphuric acid), or by means of sulphur trioxide or chlorsulphonic acid. For practical uses as soaps or wetting agents, the sulphonic acids thus obtained may then be neutralized with alkali metal oxides, hydroxides or carbonates or with ammonia or amines to yield water-soluble bodies having very desirable properties as wetting out agents.

By this method branched long-chained aromatic sulphonates may be obtained containing the alpha, alpha, gamma, gamma tetramethyl butyl group

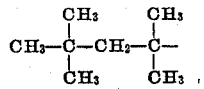

or a higher homolog or multiple thereof, in the aromatic nucleus, which sulphonates are relatively free from water-insoluble polymers or resinous materials. In order to illustrate this invention, the following examples are given:

*Example 1.*—To a mixture of 25.6 grams naphthalene and 22.5 grams di-isobutylene there was added dropwise while cooling 5 grams 96% sulphuric acid. The mixture was stirred 8 hours at a temperature between 30 and 50° C. The product may be isolated by pouring it into water, removing the oil and fractionating the product in vacuo. Advantageously, however, this step is dispensed with, and the sulphonation is carried out by adding to the product, 45 grams of fuming sulphuric acid containing 15% free $SO_3$ and stirring for 6 hours at 30–45° C. The product is then neutralized with caustic soda solution and dried. It forms a yellowish powder when ground, which is readily soluble in water to form a foamy solution having good wetting-out properties.

*Example 2.*—1 mol. of tetra-isobutylene and 1 mol. of naphthalene was stirred with 0.2 mol. of concentrated sulphuric acid at 40–50° C. for 3 hours. Then 1.8 mols of 96% sulphuric acid was added and the mixture heated 6 hours at 70° C. The product was readily soluble in water to give a soapy solution.

*Example 3.*—1 mol. of triisobutylene and 1 mol. naphthalene was stirred at 30° C. for 8 hours with 0.2 mol. of 98% sulphuric acid. When the condensation was complete, 1.8 mols of fuming sulphuric acid (15% $SO_3$) were added and the mixture stirred 6 hours at 50° C. until completely soluble in water. The product was neutralized with caustic soda solution and evaporated to dryness. It formed a cream-colored mass having good wetting-out properties. More than one mol. of the polyisobutylene may be used in which case two or more polyisobutyl groups may be introduced into the aromatic nucleus. The temperatures and time may of course be varied.

We claim:

1. A water soluble sulphonate of a condensation product of naphthalene and a polymer of isobutylene.

2. A process which comprises condensing naphthalene with a polymer of isobutylene in the presence of an acidic condensing agent as a catalyst and then sulphonating the product.

3. A water-soluble sulphonate of a condensation product of diisobutylene and naphthalene.

4. A water-soluble sulphonate of a condensation product of triisobutylene and naphthalene.

5. A water-soluble sulphonate of a condensation product of tetra-isobutylene and naphthalene.

6. A process which comprises condensing naphthalene with diisobutylene in the presence of an acidic condensing agent as a catalyst and then sulphonating the product.

7. A process which comprises condensing naphthalene with triisobutylene in the presence of an acidic condensing agent as a catalyst and then sulphonating the product.

8. A process which comprises condensing naphthalene with tetraisobutylene in the presence of an acidic condensing agent as a catalyst and then sulphonating the product.

HERMAN A. BRUSON.
OTTO STEIN.